Oct. 8, 1957   J. L. HILTON   2,808,785
ROTARY PUMPS OR COMPRESSORS
Filed March 15, 1956
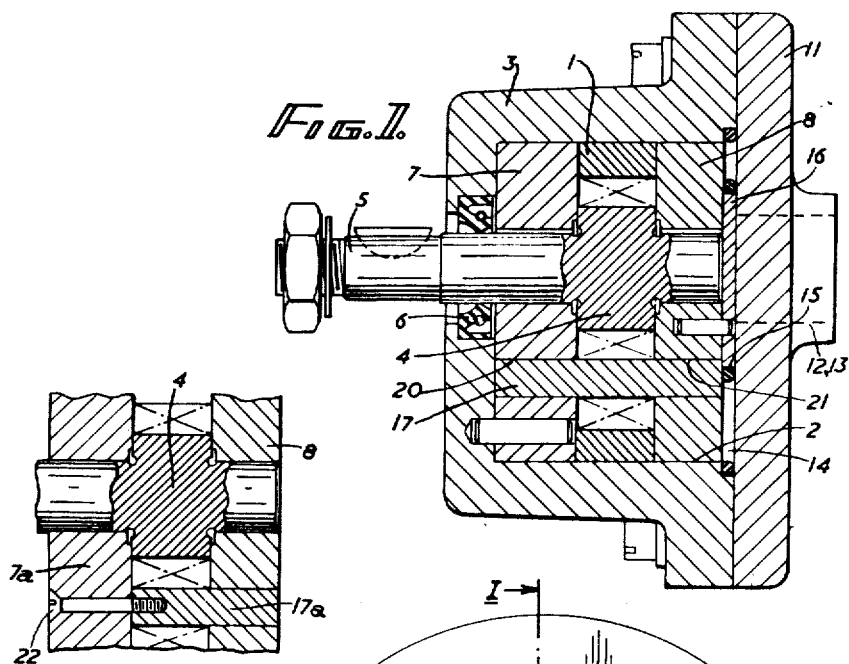
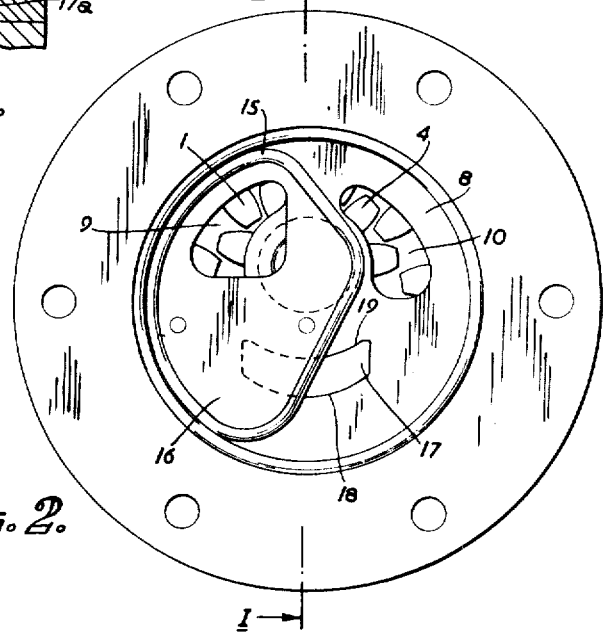
INVENTOR
JOHN LESLIE HILTON

United States Patent Office 2,808,785
Patented Oct. 8, 1957

2,808,785

ROTARY PUMPS OR COMPRESSORS

John Leslie Hilton, Hornchurch, England, assignor to The Plessey Company Limited, Ilford, England, a British company Application March 15, 1956, Serial No. 571,860

2 Claims. (Cl. 103—126)

This invention relates to rotary pumps or motors of the type hereinafter called the type specified, in which an outer toothed member is in mesh with an eccentrically arranged inner toothed member, having a smaller number of teeth, and a crescent-shaped fillet member occupies the crescent shaped space formed between the inner and outer members and serves to separate the high and low pressure zones of the pump or motor.

The profile of this fillet member follows closely the lines of movement of the gear teeth, while in order to prevent leakage past the ends of the fillet member, this member is normally clamped tightly between the sides or bearing plates of the pump.

In order to limit the side clearance between the gears and the bearing faces and thereby to maintain a high volumetric efficiency of the pump, it has been previously proposed in gear pumps employing externally meshing gears to utilise the inlet and outlet pressures for applying axial loading to the pump bearing plates.

In pumps or motors of the kind specified, the provision of the fillet members has hitherto prevented the effective application of axial pressure loading to the side or bearing plates, since the distance between the side or bearing plates, and consequently the side clearances in the pump or motor, have been fixed by the axial thickness of the fillet member.

An object of the present invention is to provide a pump of the kind specified, wherein pressure loading can be effectively applied to the pump bearing or side plates.

According to the present invention, the axial thickness of the fillet member is made greater than the width of the meshing gears, and the fillet member is axially slidable with a close fit in an aperture formed in one of the bearing or side plates or in aligned apertures formed in the two bearing or side plates.

A pump embodying the invention is illustrated in the accompanying drawing.

Fig. 1 is a sectional elevation of the pump,

Fig. 2 is an end view from the outlet side without the cover, and

Fig. 3 is a fragmentary sectional elevation illustrating a modification.

Referring now first to Figs. 1 and 2, the pump comprises an internally toothed gear ring 1 mounted for rotation in a cylindrical bore 2 of a pump housing 3 and an externally toothed gear 4 of smaller diameter, which is fixed on a shaft 5 arranged eccentrically to the toothed ring 1 with the gear members 1 and 2 in meshing relation. The shaft 5 is supported in the housing 3 by a ball bearing 6. The housing 3 further contains two side or bearing plates 7 and 8, one at each face of the gears. Each of these plates has a smooth plane surface in contact with the adjacent faces of the gears 1 and 4, while the side plate 7 next to the ball bearing 6 is fixed in the housing, the other side plate 8 is axially slidable in the housing. It has two ports 9 and 10, which respectively serve as the inlet port and the outlet port of the pump. The pump housing 3 is closed at the back of this side plate 8 by a cover 11 formed with an inlet connection 12 and an outlet connection 13, which respectively communicate with the inlet and outlet ports 9 and 10. The cover 11 is spaced from the side plate 8 to leave therebetween a pressure chamber 14, which communicates freely with the outlet port 10 to provide pressure-loading for the side plate 8 to hold the latter in sealing contact with the gears and the latter in sealing contact with the other side plate 7. The pressure chamber 14 is sealed against the inlet port 9 by a gasket 15.

The latter is supported against the pressure in chamber 14 by a pressure-relief plate 16, the axial length (i. e. thickness) of which is slightly less than that of the chamber 14, and which, as described and claimed in my United States of America application Serial No. 144,081 is so shaped and arranged as to ensure that the resultant thrust forces of the pressures acting on the two sides of the gears 1 and 4 are in substantial alignment.

The fact that the fillet member 17 does not project beyond the outer surface of side plate 8 but ends substantially flush therewith, allows the low-pressure chamber determined by the endless sealing member 15 and pressure relief plate 16 to cover part of the cross-sectional area of the fillet member 17.

The crescent-shaped chamber defined by the two gears 1 and 4 and the two side plates is subdivided, in order to separate the inlet and outlet sides of the pump, by a fillet member 17 which in the usual manner has two curved surfaces 18 and 19 which respectively are enveloping cylinder surfaces in close sealing co-operation with the teeth of the gears 1 and 4. The two ends of the fillet member 17 project axially through the inner surfaces of the two side plates 7 and 8, the latter being formed with corresponding apertures 20 and 21. While these apertures form a reasonably liquid-tight seal with the fillet member 17, they allow axial relative movement of the two side plates as required for effective pressure loading of the latter. While it is generally convenient for the apertures 20 and 21 to extend, as illustrated, through the whole thickness of the plates 7 and 8, this is not essential, provided that the depth of the apertures allows the requisite axial relative movement of the side plates, while always maintaining sealing engagement of the fillet member with the two side plates.

In the modified arrangement illustrated in Fig. 3, the side plate 7 provided with aperture 20 is replaced by a plane side plate 7ª, against which the adjacent end face of the fillet member 17ª is applied with sealing contact, while the other end of the fillet member 17ª extends, as in the embodiment of Fig. 1, through the aperture 21 of the side plate 8. Close contact between the side plate 7ª and the adjacent end of the fillet member 17ª may be ensured by attachment means, for example screws 22, but this is not essential when the necessary contact pressure is ensured by pressure loading due to the pressure in chamber 14 and/or by other means such as the resilient pressure of the gasket 15.

The term pump as used in this specification is not confined to pumps for liquids but is intended to include pumps and compressors for compressible fluids.

What is claimed is:

1. An internal gear pump comprising a housing formed with a pump chamber and with an inlet and an outlet communicating with the pump chamber, an internally toother gear rotatably mounted in said pump chamber, two bearing plates mounted in the housing, one at each side of said gear in sealing contact with the respective side faces thereof, at least one of said bearing plates being movable in the housing axially of said gear, an internally toothed gear mounted in said bearing plates for rotation within and in mesh with said externally toothed gear and with its side faces in sealing contact with the bearing plates, an arcuate fillet member arranged in said pump chamber in sealing contact with the circumferences of both said gears in a zone opposite to the zone of mesh between said gears for separating a low-pressure zone and a high-pressure zone of said pump chamber, said zones being respectively in communication with said inlet and outlet, said fillet member extending through both bearing plates and terminating substantially flush with the outer side of one of said bearing plates, apertures in said last-mentioned bearing plate communicating respectively with said high-pressure and low-pressure zones for admitting said respective pressures to spaced points at the outer side of said plate, an endless flexible sealing member interposed between the outer side of said plate and the housing to separate two areas respectively including said two spaced points whereby pressure from the high-pressure zone will act on one of said areas to urge the bearing plate into sealing contact with the gears, and a substantially rigid stiffener member encircled by said sealing member for locating the sealing member relative to the housing and bearing plate.

2. A gear pump as claimed in claim 1, wherein the flexible sealing member extends across the end surface of the fillet member.

References Cited in the file of this patent

UNITED STATES PATENTS

| 1,127,668 | Nielsen et al. | Feb. 9, 1915 |
| 1,442,828 | Rotermund | Jan. 23, 1923 |
| 1,709,580 | Jensen | Apr. 16, 1929 |
| 1,780,109 | Berglund | Oct. 28, 1930 |
| 2,044,873 | Beust | June 23, 1936 |
| 2,701,532 | Bakewell | Feb. 8, 1955 |

FOREIGN PATENTS

| 659,600 | Great Britain | Oct. 24, 1951 |
| 1,098,815 | France | Mar. 9, 1955 |

UNITED STATES PATENT OFFICE
CERTIFICATE OF CORRECTION

Patent No. 2,808,785                                          October 8, 1957

John Leslie Hilton

It is hereby certified that error appears in the printed specification of the above numbered patent requiring correction and that the said Letters Patent should read as corrected below.

Column 2, line 68, for "toother" read — toothed —; column 3, line 1, for "internally" read — externally —; line 2, for "externally" read — internally —.

Signed and sealed this 5th day of May 1959.

(SEAL)
Attest:

KARL H. AXLINE                                                ROBERT C. WATSON

Attesting Officer                                            Commissioner of Patents